3,702,844
POLYVINYL ALCOHOL-PHOSPHORIC ACID FILMS
Ronald F. Ofstead, Maplewood, and Ramsis Gobran, Roseville, Minn., assignors to Minnesota Mining & Manufacturing Company, St. Paul, Minn.
No Drawing. Continuation-in-part of application Ser. No. 798,482, Sept. 19, 1968, which is a division of application Ser. No. 504,139, Oct. 23, 1965. This application Aug. 17, 1970, Ser. No. 64,576
Int. Cl. C08f 29/36, 45/72
U.S. Cl. 260—91.3 VA                3 Claims

ABSTRACT OF THE DISCLOSURE

Coatings and self-supporting films of polyvinyl alcohol are provided, said films and coatings comprising polyvinyl alcohol containing from 1 to 20 percent of orthophosphoric acid, and said film being colorless, transparent, semi-permeable, and strong. The films and coatings are dried at or near room temperature after being coated.

---

This application is a continuation-in-part of our prior filed application U.S. Ser. No. 798,482, filed Sept. 19, 1968 now abandoned, which was a divisional application of parent application U.S. Ser. No. 504,139, filed Oct. 23, 1965, now U.S. Patent No. 3,453,113, issued July 1, 1969.

Background of the invention

This invention relates to photographic emulsions and coatings and more particularly, to films and coatings containing polyvinyl alcohol and to hardeners for use therein.

Much research work has been carried out heretofore in a search for synthetic materials which would be free from the disadvantages of gelatin for use in photographic and coating applications. A number of materials have been developed which have the thermally reversible gelling properties of gelatin dispersions, and which can be used, e.g., as binders for photographic emulsions. Among these is polyvinyl alcohol, which can be used as such, or with other water dispersible materials as a photographic emulsion gelling agent and binder.

In the photographic field, emulsions containing polyvinyl alcohol require the addition of hardening agents so that after coating of the emulsion upon the support or substrate, the photosensitive material can be exposed and then further processed by the usual procedures using aqueous photographic processing solutions. While a number of hardening agents have been available heretofore, they have certain disadvantages, such as hardening the coating system too rapidly, thus interfering with coating techniques; insufficient permeability of the resulting coating layer after drying so that, e.g., developing solutions could not penetrate, and the like. Another disadvantage of some of these hardeners is their failure to harden the coating sufficiently to provide satisfactory mechanical stability during various processing operations.

Hardening of polyvinyl alcohol by dehydration of an aqueous solution thereof using heat by itself or using an acid catalyst in conjunction with heat is known to the art. However, such processes produce highly colored and rigid products. For example, in Jones, Polyvinyl Alcohol, British Plastics, vol. 16 (1944), pp. 77–80, it is stated that films of polyvinyl alcohol cast from aqueous solutions thereof may be rendered water-insoluble by heating them to about 160° C. Jones also states that the insolubilization of polyvinyl alcohol may be carried at lower temperatures in the presence of traces of acids or condensing agents. Jones further states that films cast from aqueous solutions of the alcohol containing 5 percent of phosphoric acid on the weight of the polyvinyl alcohol on being heated at 110° C. assume a reddish color and become completely insoluble in water. For many applications, e.g., photographic films, the reddish color is very objectionable.

It is an object of the present invention to provide novel films and coatings which are cast from solutions of polyvinyl alcohol and phosphoric acid, and a process for the making of such films and coatings.

It is another object of this invention to provide novel photographic emulsions which contain polyvinyl alcohol as a gelling agent and binder therefor, and a new hardening agent and photographic materials using such emulsions.

In accordance with the above and other objects of the invention, it has been found that by the use of orthophosphoric acid under certain conditions as a hardening agent for coating systems containing polyvinyl alcohol, very useful films and coated materials can be prepared. Aqueous emulsions and solutions thus prepared have a long pre-coating shelf life without irreversibly gelling or hardening, and they can be stored at ordinary temperatures for a long time before coating. After coating, the emulsion is sufficiently hard to make it abrasion-resistant, while at the same time, the dry coating is permeable to aqueous solutions to such a degree that complete development, fixing and washing can occur. Additionally, it is unexpectedly found that the photographic coating is further hardened during development when basic (alkaline) developer solutions are used.

Polyvinyl alcohol is prepared by the hydrolysis (alcoholysis) of polyvinyl acetate. This process is ordinarily not carried to completion and it is to be understood that the polyvinyl alcohol polymers used herein can contain a proportion of unhydrolyzed acetate groups.

Broadly speaking, the orthophosphoric acid is added to the photographic emulsion system or other coating system containing polyvinyl alcohol during mixing of the emulsion or coating. Thus, for example, to an aqueous mixture containing a halide ion source and polyvinyl alcohol in amount sufficient to provide the desired binder properties for an ultimate photographic emulsion is slowly added dilute phosphoric acid while stirring to provide a homogeneous mixture. In the dark, a soluble silver salt, e.g., silver nitrate, is added in desired amount with stirring. Silver halide is formed in the usual manner. The emulsion may then, if desired, be kept at an elevated temperature for Ostwald ripening, following which it is coated, as on paper or a synthetic resin film substrate, or glass, in the usual way.

The amount of polyvinyl alcohol employed in any particular emulsion system may vary, depending upon whether or not it is the only gelling agent employed in the particular emulsion system used. Commonly, 5 to 10 parts of polyvinyl alcohol of medium molecular weight as used for gelling fluids per 100 parts of water are used when this is the only synthetic hydrophilic peptizing colloid employed. About 1 to 20 percent of orthophosphoric acid based on the dry weight of the polyvinyl alcohol is used as a hardener. Conveniently, the phosphoric acid is added as an aqueous solution of the commonly available 85 percent orthophosphoric acid. For photographic purposes, reagent grade material is used to avoid undesirable impurities.

In non-photographic applications, solutions of polyvinyl alcohol can be used for sizing paper, coatings on paper and cloth, cement or glue, adhesives, etc. These can be prepared in concentrations of upwards of about 1 percent by weight; and orthophosphoric acid, when added in amounts of about 1 to 20 percent based on the dry weight of the polyvinyl alcohol, strengthens and hardens the coatings made therewith. Drying of the solutions after coating them on a substrate is carried out under ambient conditions; i.e., room temperature and atmospheric pressure. Clear, colorless, transparent, strong coatings and films are obtained on drying.

The molecular weight of the polyvinyl alcohol affects its water-solubility, as is known; lower molecular weight polymer may be soluble to as much as 20 to 30 percent by weight or more, while high molecular weight material is less soluble. The choice of molecular weight and concentration will depend on the end use and one skilled in the art will have no difficulty in selecting the appropriate material and amounts.

The invention is illustrated by the following examples, in which all parts are by weight unless otherwise specified.

Example 1

A well stirred mixture of polyethylenimine, 5 parts (50 percent aqueous solution, molecular weight equals 30,000 to 40,000) and polyvinyl alcohol, 62.5 parts (8 percent aqueous solution, available under the trade name "Elvanol 72–51") is acidified to pH 3 by the addition of hydrobromic acid. To the well stirred mixture is added slowly 2 parts of dilute phosphoric acid (made by adding 0.5 part of 85 percent orthophosphoric acid to 1.5 parts of water), with the thorough mixing to insure homogeneity. The mixture is then placed in the dark, and a solution of 5 parts of silver nitrate in 5 parts of water is added with thorough mixing over a period of about 10 seconds. The mixture is further stirred for about 3 minutes. To this is added 1 part of surfactant solution (12 percent aqueous solution of "Poly-Tergent J-300," a nonionic, water soluble polyether) and the mixture is stirred for an additional minute. The resulting emulsion is knife coated upon paper base, in the dark, and upon plastic film support, the coatings are air dried and stored in a dark place. All of the steps in the preparation of the emulsion are performed at or near room temperature.

When exposed to light through a negative in the usual way, and developed with the ordinary paper developing solutions, excellent prints with good contrast are obtained, the surface of the paper being semi-glossy and resistant to abrasion even during processing in the aqueous solutions.

Example 2

To 100 parts of a 10 percent aqueous solution of polyvinyl alcohol prepared from high molecular weight polyvinyl acetate by hydrolysis, the degree of hydrolysis being about 80 percent, are added, with stirring, 3 parts of 50 percent aqueous orthophosphoric acid ($d=1.335$, prepared by diluting 85 percent orthophosphoric acid as commercially available). Usually the polyvinyl alcohol and the orthophosphoric acid are mixed at about room temperature, although higher temperatures may also be used. Generally, the dilute phosphoric acid is added to an aqueous polyvinyl alcohol solution to provide a resulting solution wherein the weight of the acid is 1 to 20 percent of the weight of the polyvinyl alcohol. The solution, after mixing, can be stored for days without gelling or hardening, at room temperature. When coated upon paper and dried at or near room temperature, (i.e., up to about 20° C. higher than room temperature) the coating is stronger and tougher than a similar coating prepared with the same polyvinyl alcohol solution which does not contain orthophosphoric acid. Additionally, the coating of this example is clear, colorless, transparent, water-permeable and has very good adhesion to glass, plastic films, paper and other surfaces.

Example 3

To 100 parts of a 10 percent aqueous solution of polyvinyl alcohol (prepared using "Elvanol 71–24," a highly hydrolyzed polyvinyl acetate available from Du Pont), are added at room temperature, with stirring, 3 parts of 50 percent aqueous orthophosphoric acid ($d=1.335$, prepared by diluting 85 percent othophosphoric acid as commercially available). The solution, after mixing, can be stored for days without gelling or hardening, at room temperature. The solution is conveniently cast into a film and dried at or near room temperature. The resulting dried film is self-supporting, transparent, colorless, tough and water permeable. Another film prepared from a polyvinyl alcohol solution which did not contain phosphoric acid was very stiff and hard in film form.

The films prepared in accordance with the invention are useful as semi-permeable membranes, non-fogging coatings for glass or plastic materials, moistenable coatings on medical devices or prosthetics, and as coatings on decorative films.

Films and coatings made from the polyvinyl alcohol/ orthophosphoric acid compositions may contain various fillers, i.e., clays, pigments, tackifiers, dyes, iron oxide, other metal oxides or metals, in amounts up to about 60 weight percent.

What is claimed is:
1. A self-supporting film of polyvinyl alcohol, said film consisting essentially of polyvinyl alcohol and from 1 to 20 percent of orthophosphoric acid based on the dry weight of said polyvinyl alcohol, and said film being colorless, transparent, semi-permeable, and strong.

2. A process for forming the film of claim 1, comprising the steps of:
   (a) adding dilute orthophosphoric acid to an aqueous polyvinyl alcohol solution to provide a resulting solution containing from 1 to 20 percent of said acid based on the dry weight of said polyvinyl alcohol,
   (b) coating said resulting solution into the form of a wet coating, and
   (c) drying said wet coating of step (b) at or near room temperature.

3. A substrate having a coating thereon, said coating consisting essentially of polyvinyl alcohol and from 1 to 20 percent of orthophosphoric acid based on the dry weight of said polyvinyl alcohol, and said coating being colorless, transparent, semi-permeable and strong.

References Cited

UNITED STATES PATENTS

| 3,197,429 | 7/1965 | Baatz | 260—29.6 |
| 3,296,174 | 1/1967 | Picotard | 260—29.6 |
| 3,437,484 | 4/1969 | Nadeau | 260—91.3 |

OTHER REFERENCES

Jones, I.: Polyvinyl Alcohol, in British Plastics, 16 (1944), pp. 77–80.

JAMES A. SEIDLECK, Primary Examiner

S. M. LEVIN, Assistant Examiner

U.S. Cl. X.R.

260—29.6 BM; 29.6 NR, 41 A, 41 B; 96—85; 117—124 E, 138.8 A, 155